United States Patent

[11] 3,609,593

[72] Inventors Harry J. Boll
Berkeley Heights;
Martin P. Lepselter, New Providence, both of N.J.
[21] Appl. No. 552,955
[22] Filed May 25, 1966
[45] Patented Sept. 28, 1971
[73] Assignee Bell Telephone Laboratories, Incorporated Murray Hill, Berkeley Heights, N.J.

[54] VIBRATORY REED DEVICE
8 Claims, 6 Drawing Figs.

[52] U.S. Cl. .......... 331/156, 310/4, 310/25, 318/117, 321/1.5, 330/38 M, 330/62, 333/6, 333/71
[51] Int. Cl. .......... H03b 5/30
[50] Field of Search .......... 333/71; 310/8.9; 331/116, 156

*Primary Examiner*—Roy Lake
*Assistant Examiner*—Darwin R. Hostetter
*Attorneys*—R. J. Guenther and Arthur J. Torsiglieri

CLAIM: An oscillator comprising an elongated member to which a piezoresistive element is coupled, the member being capable of flexing in response to a change in temperature and having a resonant frequency of flexing vibration, said member having a minimum level of heating for producing continuous oscillation of the member at said resonant frequency, and direct current means for heating said member in response to the direct current applied to the piezoresistive element appropriate for supplying said minimum level of heating of the member and thereby to produce said oscillation of the member.

INVENTORS H. J. BOLL
M. P. LEPSELTER
BY Wilford L. Wisner
ATTORNEY

VIBRATORY REED DEVICE

This invention relates to vibratory reed devices such as may be employed in oscillators and filters.

Vibratory reed devices are typically employed in relatively low frequency resonant circuits since the large inductors and capacitors needed for resonance at low frequencies are expensive, bulky and not readily available. Moreover, a vibratory reed device typically has a Q, or quality factor as a resonator, that compares favorably with the finest purely electronic circuits.

The microelectronic circuit art has recently created a need to miniaturize vibratory reed devices to make them compatible with integrated circuit fabrication techniques. For example, if the circuit of a telephone handset is to be made by a microelectronic integrated circuit technique, it is desirable that such things as the tone ringer and any oscillator required for signaling be included as an integral part of the integrated circuit. This could be done if a vibratory reed element could be employed as a low-frequency resonator.

We have recognized that fabrication could be facilitated if the vibratory reed device could be made from semiconductive material, since it could then readily be included in an integrated circuit.

As a further example of the need for a miniaturized vibratory reed device compatible with integrated circuit technique, consider the telemetry that must be carried on between an unmanned space probe or moon station and a station on earth. Many of the data, such as temperature measurements, change relatively slowly and require a relatively slow rate of information transmission. It follows that a relatively narrow band of frequencies can be occupied by the modulated signal. To make the most economical use of the frequency bands available for telemetry, it is advantageous to modulate a subcarrier wave of very low frequency, i.e., a few cycles per second, with the temperature data and subsequently to modulate the microwave carrier wave with the temperature-modulated subcarrier as well as with other subcarriers modulated by other data. It is thus advantageous to have at the transmitter compact means for efficiently generating the unmodulated low-frequency subcarrier wave and to have at the receiver means for efficiently responding to the subcarrier frequency. For these purposes, a high-Q resonant device such as a vibratory reed is clearly desirable.

In seeking to satisfy such needs, we have found that a central problem arises with respect to the technique employed for driving the vibratory reed device. In particular, the driving element for prior art vibratory reed devices may be piezoelectric, electrostrictive, magnetostrictive, or magnetic in nature. In all of these cases, the combination of reed and driving element is not readily fabricated by integrated circuit techniques. Moreover, for some applications, impedance matching of a signal source to the driving element is desirable but not readily obtained because of the reactive nature of the driving element.

Accordingly, it is an object of this invention to drive vibratory reed devices in a manner that facilitates their employment in integrated circuit arrangements.

According to our invention, a vibratory reed device is driven by heat-producing means for producing a bending moment within the vibratory member.

In a preferred embodiment of the invention, the vibratory reed device includes a member fabricated of single crystal semiconductive material, i.e., material of the type employed in integrated circuit monoliths; and the member is cantilevered upon a heat-conducting substrate. The heat producing means is integrated into the semiconductive member. It may be semiconductive material that may, or may not, have an impurity concentration that is different from that of the material of the member.

In this preferred embodiment, the heat-producing means is disposed and adapted with respect to the semiconductor member to produce a substantial bending moment in response to an input electrical signal. The bending moment is amplified by a differential expansion member on one surface of the semiconductor member.

In some of the embodiments, such as those employed as filters, the output coupling means comprises a piezoresistor or other device similar to that employed for the heating means. Nevertheless, the bias level and location of the output coupling means are chosen to render the output coupling means ineffective to drive the member.

In other embodiments, such as those employed as oscillators, the output may be derived from the voltage across or the current through the heating means.

Various features of the invention reside in the mutual adaptation of the reed member and the driving means to provide that the member vibrates predominantly at a resonant frequency in response to a direct-current or multiple-frequency input to the heating means.

In particular, the heating means is positioned substantially a distance, $L$, from the cantilever support such that $$(1/30)\, T_r < l^2/\alpha) < 30T_r, \qquad (1)$$

where $\alpha$ is the thermal diffusivity and $T_r$ is the period of the resonant frequency, all in compatible units.

With this condition satisfied, maximum bending moment in the member tends to occur on a steady state basis approximately one-quarter of the resonant period after the maximum power input.

It is one characteristic of the present invention that the preceding adaption is effective for a vibratory reed device regardless of the material of the vibratory member. Thus, a member comprising dielectric material or electrically conducting material, such as metals, can also be driven at its resonant frequency by heating means. It should be noted that the resonant frequency of interest here is a frequency characteristic of the reed member alone, not a frequency characteristic of a negative feedback system employed for heating control.

Other features and advantages of the present invention will become apparent from the following detailed description taken in conjunction with the drawing, in which:

FIGS. 4 and 5 show curves that are useful in explaining the theory and operation of the invention.

Figure 1:
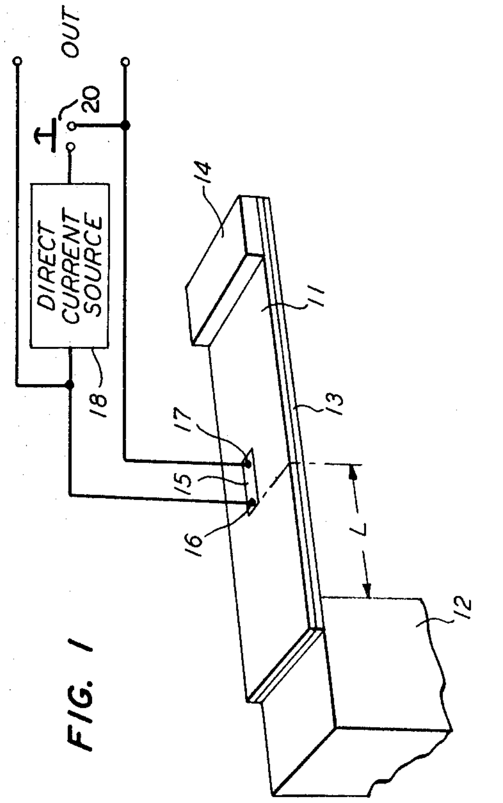
FIG. 1 is a partially pictorial and partially schematic illustration of a first embodiment of the invention employed as an oscillator.

In the embodiment of FIG. 1, a vibratory reed device, such as we have invented, is employed as an oscillator. The device includes an elongated reed member 11, which is illustratively a semiconductive material capable of flexing. The member 11 is cantilevered upon a thermally conducting support 12. Bonded to the underside of the member 11 is a differential thermal expansion strip 13. A body 14 is disposed upon the end of the member 11 and enables tuning of the resonant frequency of the device in a manner that will be explained hereinafter.

The means for heating the member 11 to excite resonant vibrations thereof comprises a piezoresistor 15 formed by diffusion of an impurity into the surface of member 11. The crystalline axis of member 11, and the direction of current flow in piezoresistor 15 are so oriented that the binding of member 11 induces a large change of resistance in piezoresistor 15. Ohmic contacts 16 and 17 are made to resistor 15 near its ends and are connected across a direct-current source 18 and a pushbutton switch 20 in series. The output terminals of the device are connected directly to the contacts 16 and 17.

The elongated member 11 illustratively comprises a single crystal of silicon having an N-type doping concentration between $1\times10^{12}$ to $1\times10^{18}$ parts per cubic centimeter. Any of the usual N-type dopants for silicon may be employed.

Member 11 is illustratively 100 mils (thousandths of an inch) from the supporting edge of support 12 to its free end, 5 mils wide and 1-mil thick.

The differential thermal expansion strip 13 is illustratively copper that is plated to the underside of member 11 before mounting upon support 12. The mounting of these components upon support 12 is accomplished by soldering or by thermocompression bonding. The strip 13 illustratively is 1-mil thick.

The body 14 which serves as the tuning element at the free end of member 11 is a bar of gold 10-mils thick, 20 mils in the direction of elongation of member 11, and 5 mils in the direction of the width of member 11. While element 14 is thus not drawn to scale in FIG. 1, its most essential features are its total mass and its location close to the free end of member 11.

The resonant frequency of the cantilevered combination of member 11, differential thermal expansion strip 13 and element 14 is approximately 1,000 cycles per sound. This resonant frequency can be increased, i.e., the combination tuned, by etching away gold from element 14 in a continuously flowing atmosphere of moist chlorine gas. The gold chloride product of the etching process is volatile and is carried away by the continuous flow of the gas. The etching can be carried out while the reed is being driven; hence, the resonant frequency can be adjusted very accurately by simply stopping the flow of gas etchant when the desired frequency is attained. As a practical matter, one would ordinarily start the process with a sightly greater mass contained in the element 14 than is desired.

The piezoresistor 15 is illustratively P-type silicon having a dopant concentration between $1\times10^{14}$ and $1\times10^{19}$ parts per cubic centimeter. The piezoresistor 15 is illustratively 1 mil long and one-half mil wide and is formed to a depth of about 1 micron or more in member 11. Typically, a P-type dopant of the type usually employed in silicon is diffused into the surface of the N-type reed member 11 to the desired depth; but out diffusion of the N-type dopant from member 11 may also be employed if sufficient P-type dopant is originally present. For this particular case, contacts 16 and 17 to piezoresistor 15 and the [111] crystal-lographic directions of both piezoresistor and reed member are aligned along the long dimension of member 11. As an alternative, the piezoresistor 15 may be formed without changing the dopant concentration of member 11, if member 11 is P-type silicon, merely by depositing ohmic contacts 16 and 17 with the illustrated alignment. Differing alignments can be used with other semiconductor materials. For maximum effect in exciting resonant vibrations of member 11, the piezoresistor 15 is spaced at a distance $L$ from the thermally conducting support 12, where $L^2$ is equal to one-third of the thermal diffusivity of member 11 times the period of the resonant frequency and is measured to the center of the piezoresistor 15. For the illustrative embodiment described, $L$ is 7 mils. More particularly, this spacing of piezoresistor 15 from support 12 permits the input driving power to produce maximum bending moment in member 11 on a steady state basis approximately one-quarter of the resonant period after the maximum heating. The input impedance of the amplifier connected across the indicated output terminals of the device is impedance matched to the average value of piezoresistor 15. Illustratively, both values are 1,000 ohms, source 18 providing a direct current of 10 milliamperes. The source 18 is illustratively a high-output impedance transistor circuit arranged to supply substantially constant current from the collector of a transistor. While impedance matching of the input power source to the heating element may be employed in some embodiments of the invention, it is not essential to the embodiment of FIG. 1.

The pushbutton 20 is illustratively one of the subscriber-operated pushbuttons of a pushbutton telephone set. In this case, the indicated output terminals would be connected to the subscriber line which is ultimately connected to a telephone central office. The central office would receive the oscillation generated by the device of FIG. 1 and would process it as a dialing signal.

In the operation of the device of FIG. 1, the P-type silicon peizoresistor 15 has its maximum resistance when the member 11 is fully flexed downward toward the side away from piezoresistor 15 and has its minimum resistance when the member 11 is fully flexed in the opposite sense. It has approximately its average value when the member 11 is in the substantially unflexed or quiescent position shown. When the pushbutton switch 20 is closed, current flows from source 18 through the piezoresistor 15. This current generates heat within piezoresistor 15; and the temperature rises in the immediate vicinity of piezoresistor 15. In general, a temperature rise is produced along member 11. The differential thermal expansion strip 13 tends to expand more than the silicon in the region of high temperature. Thus, the lower surface of member 11 tends to expand more than the upper surface; and this tendency causes the portion of the device beyond support 12 to flex upward. As the upward flexing occurs, the resistance of piezoresistor 15 decreases. Since this decrease reduces the power dissipated in piezoresistor 15, the thermally induced upward bending moment falls. Also an elastic restoring moment starts to appear in the member 11. The elastic restoring moment initially does not balance the bending moment; and the thermal inertia of the device does not permit the bending moment to decrease as rapidly as the electrical power input does. So long as an unbalanced thermal bending moment exists, the cantilevered member 11, strip 13 and the body 14 pick up speed. The maximum velocity of the body 14 is finally attained when the elastic restoring moment balances the bending moment; but the kinetic inertia of the body 14 carries the flexure past the balance point until the predominating elastic restoring moment has decreased the velocity to zero. At this point of maximum flexure, the elastic restoring moment is substantially greater than the bending moment. Accordingly, the member 11, strip 13 and body 14 begin to move downward, that is, away from the side of member 11 that bears piezoresistor 15. The resistance of piezoresistor 15 now starts to increase toward its average value. Since this increase is a variation toward the value for greater power transfer from source 18, the temperature at piezoresistor 15 starts to increase. Nevertheless, the thermal bending moment tends to lag the increase in electrical input power because of thermal inertia. Thus, the member 11, strip 13 and body 14 continue to pick up speed while moving in the downward direction. The speed thus acquired is sufficient to carry the assembly to the lower limit of its travel, where the elastic restoring moment and the bending moment have reduced the speed to zero. It should be noted that in the process both the resistance of piezoresistor 15 and the electrical input power attain maximum values at the time when the extreme lower limit of flexure is reached. The combined unbalanced forces now start to accelerate the assembly in the upward direction. Although the elastic restoring force decreases and soon changes polarity, the thermal bending moment tends to increase for a period of time thereafter because of thermal inertia. Thus a new cycle of oscillation is started.

Figure 4:
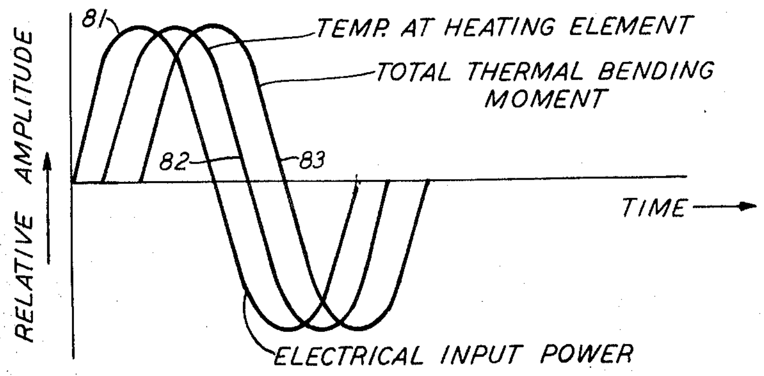
Figure 4:
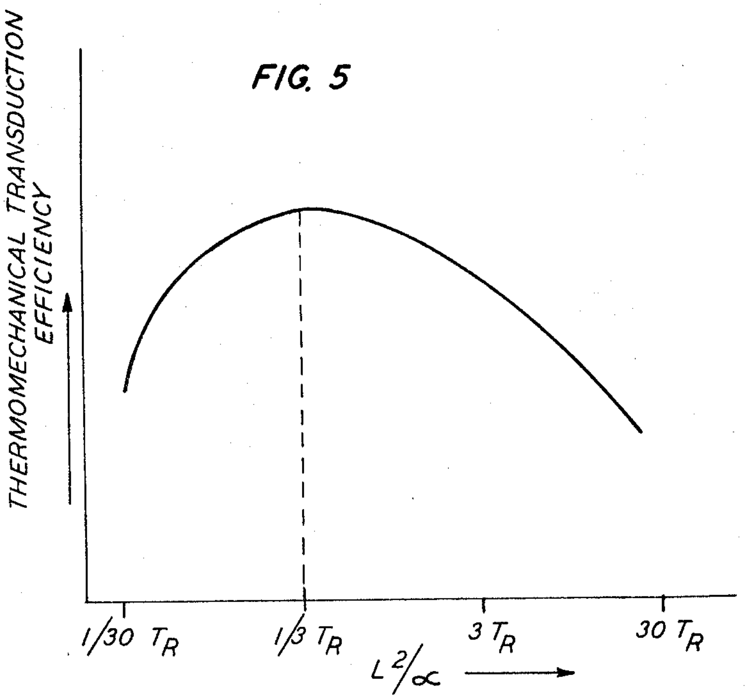

It should be apparent from the preceding description that there is a minimum level of average input power above which sustained oscillations of the device of FIG. 1 will occur. Positive feedback such as is required for any oscillator is provided by the appropriate phase relationships between the electrical input power (curve 81 of FIG. 4), the temperature at the heating element (curve 82 of FIG. 4) and the total thermal bending moment (curve 83 of FIG. 4). Curves 81, 82 and 83 depict the steady state operation of the device and do not describe the initial transient that was described in a qualitative way above. It will be noted that the temperature curve 82 lags the input electrical power input 81 by 45° and that the total thermal bending moment curve 83 lags the input power curve 81 by a total of 90°.

The minimum average input power level for sustained oscillations can easily be determined experimentally. For example, additional direct current sources can be employed to supplement source 18 in order to provide a variation in input power. Such techniques are within the capabilities of the electrical measurements art.

For the arrangement of the embodiment of FIG. 1 as specifically described hereinbefore, the approximate minimum average power, or threshold power, for sustained oscillations is, $$P_{d.c} = \frac{W \cdot l \cdot \rho_{ave} \cdot c_p \cdot \omega_r \cdot t_\beta}{36 \cdot Q \cdot \Pi \cdot E \cdot \beta}, \quad (2)$$

where $w$ is the width of the reed, $l$ is its length, $\rho_{ave}$ is the average density of the reed and differential thermal expansion strip, $c_p$ is the average specific heat of the combination, $\omega_r$ is the radian resonant frequency, $t$ is the thickness of the combination, $Q$ is the resonation quality factor, $\Pi$ is the piezoresistance coefficient, $E$ is Young's modulus, and $\beta$ is the difference between the thermal expansion coefficients of the reed and the differential thermal expansion strip, all in compatible units where the factor 36 is itself dimensionless.

The embodiment of FIG. 1 has been described specifically as having substantially optimum spacing of the heating means, piezoresistor 15, from the support 12 for the particular resonant frequency of the device. More generally, oscillations can still be obtained, although the effective input power levels will rise appreciably, for substantial variations in the ratio of the spacing $L$ to the square root of the resonant period $T_r$, of the device. The effective range of variation of the ratio $L/T_r^{1/2}$ over which oscillations can be maintained is depicted by curve 91 of FIG. 5, and extends from $\sqrt{\alpha/30}$ to $\sqrt{30\alpha}$, where $\alpha$ is the thermal diffusivity in compatible units of length squared per unit time.

Figure 2:
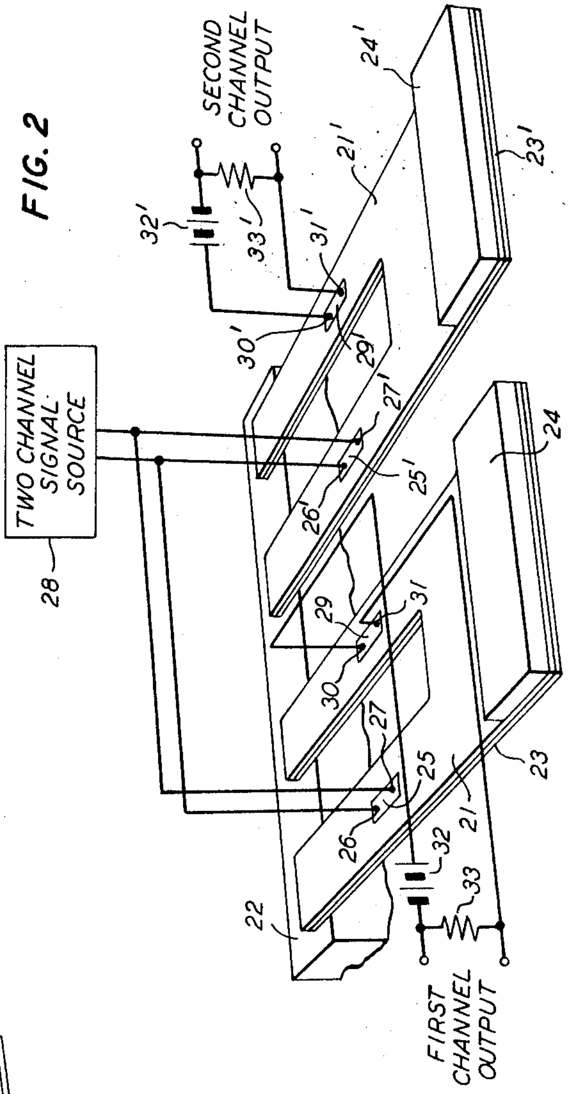
FIG. 2 is a partially pictorial and partially schematic illustration of a second embodiment of the invention employed as a filter.

A second embodiment of the present invention, a channel separation filter, is shown in FIG. 2. In the arrangement of FIG. 2, two signals have typically been frequency-multiplexed upon a common line. This common line and the apparatus preceding it are designated in FIG. 2. 2 as a two-channel signal source 28. Each of the so-called signal channels can be characterized by its center frequency, which differs from that of the other channel. It should be readily apparent that these channels can be effectively separated by resonant circuits that are tuned to the respective center frequencies and are respectively connected between the source 28 and the ultimate separate channel outputs to act as filters. After such separation, the signal in each channel may be transmitted to a utilization apparatus separate from that to which the other signal is transmitted.

The U-shaped reed members 21 and 21' are of the same semiconductive material as member 11 of the embodiment of FIG. 1; and each leg thereof has substantially the same dimensions as member 11 of FIG. 1. The gold bodies 24 and 24'' are more than twice as long as body 14 of FIG. 1 in a direction transverse to the elongation of members 21 and 21' but are scaled down in their other dimensions to have approximately twice the mass of the body 14. They differ from one another by an amount sufficient to tune the U-shaped members 21 and 21' to the respective center frequencies. The differential expansion strips 23 and 23' are similar to the differential expansion strip 13 of FIG. 1.

The output of the two-channel signal source 28 is connected across pairs of contacts 26, 27 and 26', 27' in parallel; and the diffused resistors 25 and 25' are provided between the respective pairs of contacts to provide heating functions like that of piezoresistor 15 of FIG. 1. Resistors 25 and 25' do not need to be elongated in a particular direction in this embodiment, since they merely supply heat.

The respective filter outputs are derived from piezoresistors 29 and 29' that are elongated along the [111] crystalline axis of the semiconductive material, if the piezoresistors are P-type silicon; and the pairs of ohmic contacts 30 and 31 and 30' and 31' respectively aligned along that axis. The material of the piezoresistors and the material of member 11 have a common crystallographic orientation. Connected in series across contacts 30 and 31 are the output bias source 32 and the bias current-limiting resistor 33, the first channel output being taken across resistor 33. Similarly, the bias source 32' and bias current limiting resistor 33' are connected in series across the contacts 30' and 31', the second channel output being taken across resistor 33'. Illustratively, sources 32 and 32' have voltages of one volt and the bias-current-limiting resistors 33 and 33' each have a resistance of 1,000 Ω, so that no substantial amount of heating occurs in the vicinity of piezoresistors 29 and 29'. The resistance of each of the piezoresistors 29 and 29' is preferably impedance matched to its connected output circuit in order to get maximum power transfer to the output circuit.

In the operation of the embodiment of FIG. 2, it is apparent that the output current will be minimum when the respective members 21 and 21' are fully flexed downward making the resistances of the piezoresistor 29 and 29' maximum. Conversely, maximum output currents at the respective channel outputs occur when the members 21 and 21' are fully flexed upward. There is no synchronization between the flexures of the two members 21 and 21' because they are responding predominantly to differing frequency components of the signals from source 28. The resonant frequencies of the reed members are sufficiently sharply defined that each member will not respond to the resonant frequency of the other.

An important function of the U-shaped configuration of the reed members 21 and 21' is to provide thermal isolation of the output transducer from the heating means. In other words, the thermal path length between input and output tranducers is lengthened without a substantial effect upon the resonant frequency of the reed member.

Vibratory reed devices according to the present invention offer a further substantial advantage that integrated electronic circuits can readily be combined therewith. In fact, microelectronic circuits can be formed directly upon the surface of the reed members.

Figure 3:
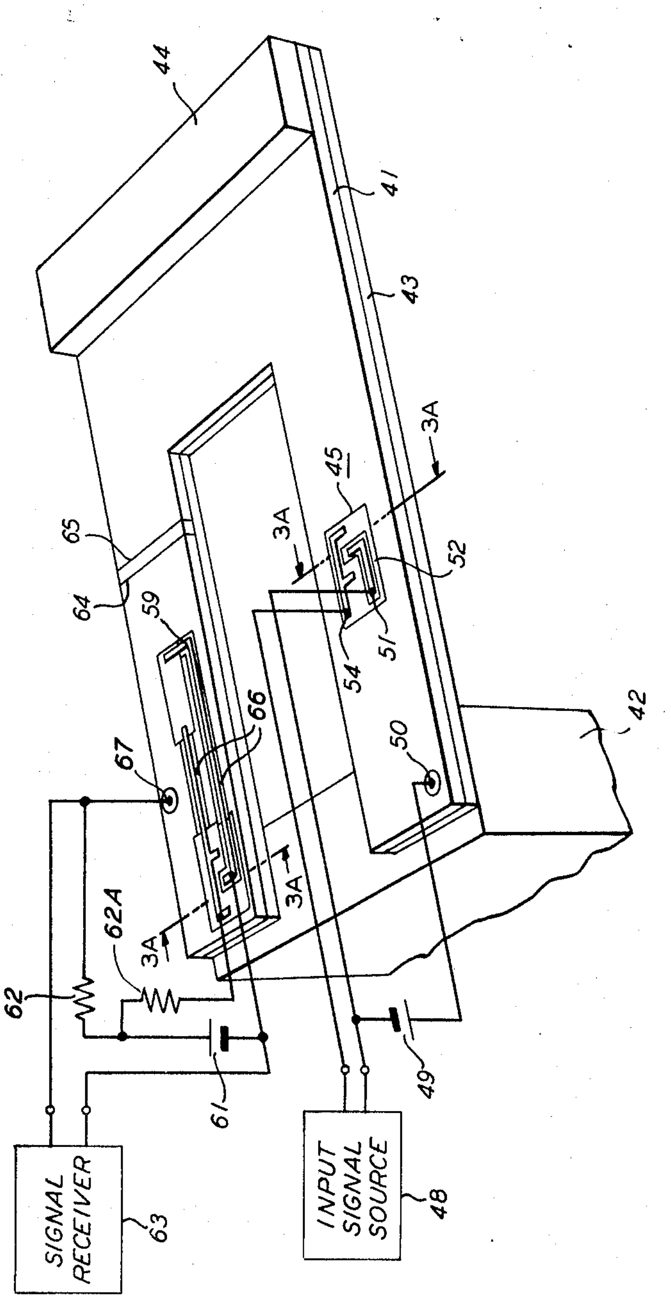
FIG. 3 is a partially pictorial and partially schematic illustration of a preferred integrated-circuit embodiment of the invention employed as a filter.

An example of such an integrated circuit arrangement is shown in FIG. 3. The U-shaped vibratory reed member 41 is again N-type silicon to which is bonded a differential thermal expansion strip 43. The member 41 is cantilevered upon a thermally conductive support 42. The body 44 of gold is disposed upon the free end of the reed member 41 and is employed for the purpose of tuning the device as explained hereinbefore.

The heating means employed to drive the reed member 41 is the thermal driver transistor 45 which is disposed upon the upper surface of one leg of the U-shaped reed member 41 at the appropriate spacing $L$ from the support 42, where $L^2$ is one third the thermal diffusivity of the reed times its resonant period. The collector circuit of driver transistor 45 is short-circuited for alternating current signals by means of the connection of bias battery 49 directly across it. Thus, the output power of the transistor is dissipated in its collector junction at the appropriate distance $L$ from the thermally conductive support 42. Its resistive input impedance is matched to the output impedance of the signal source 48 in combination with the bias battery 49.

The transistor 45 is connected to the input signal source 48 and the bias battery 49 in the conventional manner for achieving amplification of the input signal; and the output signal of the transistor is fully absorbed in heating the member 41.

Figure 3A:
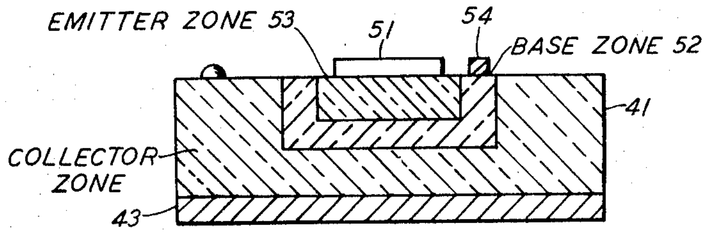
FIG. 3A is a cross-sectional view of one of the transistors integrated into the vibratory reed member of FIG. 3.

As shown in the cross-sectional view of FIG. 3A, all the zones of transistor 45 are formed in the member 41 fashion. The base zone 52 is formed by indiffusion of a P-type doping impurity; and the emitter zone 53 is formed within the base zone by diffusing into a limited portion of the P-type area an N-type doping impurity. The contacts 54 and 51 are made to the respective base and emitter zones, in the shapes shown in FIG. 3, by vacuum evaporation of a conductive material. A piezoresistor 59 is employed as an output transducer to sense changes in the strain in the other leg of the reed member 41; and the signal across it is amplified by transistor amplifier 60 which is formed in the upper surface of the member 41 in a region of support by the support 42. The transistor 60 may be formed essentially as the thermal driver transistor 45. The heat dissipated by the operation of amplifier transistor 60 in this case can be made to have substantially no effect upon the flexure of member 41 because it is not appropriately located in a flexing portion of the member 41. The piezoresistor 59 is connected across the base and emitter terminals of transistor 60. The transistor 60 is suitably biased by the source 61 and resistors 62 and 63. The emitter and collector terminals are connected across the input terminals of receiver 63. The transistors 45 and 60 are maintained electronically independent by the indiffusion of a P-type doping impurity into member 41 at a point between the two transistors to form two PN junctions 64 and 65 extending entirely through the member 41 approximately perpendicular to its direction of elongation. These two PN junctions serve to isolate the transistors. Nevertheless, the electronically isolated cantilevered portions of the reed member 41 vibrate in synchronism at the resonant frequency. Alternatively, isolation can be provided between transistors 45 and 60 in any of the ways known to workers in the integrated circuit and for maintaining electronic isolation between two transistors in a common crystal.

It will be recalled that the member 41 has dimensions of the order of a few thousandths of an inch so that the entire assembly may readily be employed as a high-Q, low-frequency filter in a microelectronic integrated circuit.

Various modifications of the embodiments of FIGS. 1, 2 and 3 can be made. For example, the vibratory reed members can be fabricated of a dielectric material such as quartz, instead of a semiconductive material. A piezoresistor would then be formed on the surface of the quartz to provide the heating means; and the output coupling could be derived via the piezoresistor or by prior art means.

A further modification of the illustrative embodiments would be to derive the output by prior art means, although piezoresistors and piezotransistors, i.e., transistors made of piezoelectric semiconductors and disposed to be subjected to strain, are preferred.

Still another modification of the illustrative embodiments would employ differential thermal expansion strips on the same surface of the reed member as the heating means, instead of the strips 13, 33, 33' and 43. In this case, one or more of the differential thermal expansion strips can be made electrically common to one or more contacts, respectively, of the heating means, yielding an easily fabricated structure.

In all cases the above-described arrangements are illustrative of a few of the many possible specific embodiments are that can represent applications of the principles of the invention. Numerous and varied other arrangements can readily be devised in accordance with these principles by those skilled in the art without departing from the spirit and scope of the invention.

What is claimed is:

1. An oscillator comprising an elongated member to which a piezoresistive element is coupled, the member being capable of flexing in response to a change in temperature and having a resonant frequency of flexing vibration, said member having a minimum level of heating for producing continuous oscillation of the member at said resonant frequency, and direct current means for heating said member in response to the direct current applied to he piezoresistive element appropriate for supplying said minimum level of heating of the member and thereby to produce said oscillation of the member.

2. An oscillator according to claim 14 in which the elongated member includes amplifying means for providing positive feedback to the piezoresistive element.

3. An oscillator according to claim 1 in which the elongated member comprises semiconductive material and in which the piezoresistive element comprises semiconductive material formed within the semiconductive material of the elongated member and provided with contacts between which the resistance varies as a function of strain in the elongated member.

4. An oscillator according to claim 1 in which the member is an elongated member comprising an elongated crystal of semiconductive material and a strip of material bonded to a surface of said crystal and having a thermal coefficient of expansion differing from that of said crystal to promote flexing of said member at the resonant frequency in a direction normal to said surface.

5. An oscillator according to claim 4 in which the strip of material comprises a metal.

6. An oscillator according to claim 1 in which the member comprises an elongated member of semiconductive material, the piezoresistive element being physically attached to the elongated member, and the output abstracting means comprises a piezoresistive semiconductor diffused into said semiconductive material and provided with connections between which the resistance varies as a function of the strain in said material.

7. An oscillator according to claim 1 including means for abstracting an output from the member.

8. An oscillator according to claim 1 in which the member is an elongated member cantilevered upon a heat-conducting support and the piezoresistive element substantially has a spacing, $L$, from said support equal to $(1/3)\ \alpha T_r$, where $T_r$ is the period of the resonant frequency and $\alpha$ is the thermal diffusivity in compatible units, to produce maximum bending moment in said member on a steady state basis approximately one-quarter of said period after the maximum heating.